(12) United States Patent
Tomky et al.

(10) Patent No.: US 12,530,055 B2
(45) Date of Patent: Jan. 20, 2026

(54) SECURE ELECTROMAGNETIC DOCKING SYSTEM

(71) Applicant: Microsoft Technology Licensing, LLC, Redmond, WA (US)

(72) Inventors: Brett Andrew Tomky, Seattle, WA (US); Denys Yaremenko, Carnation, WA (US); Devin Caplow-Munro, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 18/335,752

(22) Filed: Jun. 15, 2023

(65) Prior Publication Data
US 2024/0419219 A1    Dec. 19, 2024

(51) Int. Cl.
*G06F 1/16* (2006.01)
*H01F 7/08* (2006.01)

(52) U.S. Cl.
CPC .......... *G06F 1/1679* (2013.01); *G06F 1/1632* (2013.01); *H01F 7/081* (2013.01)

(58) Field of Classification Search
CPC .... G06F 1/1632; G06F 1/1679; G06F 1/1681; H01F 7/081; H01F 7/06; E05B 73/0082; E05B 2073/0088; H01R 13/631; H01R 2201/06; Y10T 70/5009
See application file for complete search history.

(56) References Cited

U.S. PATENT DOCUMENTS

| 5,812,356 | A | * | 9/1998 | O'Connor | G06F 1/1632 439/345 |
| 6,741,462 | B2 | * | 5/2004 | Kamphuis | G06F 1/1632 361/679.02 |
| 6,768,652 | B2 | * | 7/2004 | DeLuga | G06F 1/1632 361/801 |
| 6,885,552 | B2 | * | 4/2005 | Mullen | G06F 1/1632 361/679.41 |

(Continued)

FOREIGN PATENT DOCUMENTS

| CN | 101398904 A | | 4/2009 |
| CN | 101398904 B | * | 8/2011 |
| CN | 106529355 A | | 3/2017 |

*Primary Examiner* — Allen L Parker
*Assistant Examiner* — Martin Antonio Asmat Uceda
(74) *Attorney, Agent, or Firm* — Holzer Patel Drennan

(57) ABSTRACT

The presently disclosed secure electromagnetic docking systems provide a simplified locking interface for the user and improved security overall. The secure electromagnetic locking mechanisms are hidden from view and access by a would-be thief, which is distinct from the generally accessible nature of prior art cable and lock mechanisms. The secure electromagnetic docking systems may also be locked and unlocked via a graphical user interface (GUI), thereby eliminating a requirement that the user successfully secure a cable and lock mechanism to a computing device and a fixed object. The secure electromagnetic docking systems may comprising one or more ferromagnetic structures are biased to a locked position. An electromagnet is selectively powered to move the one or more ferromagnetic structures to an unlocked position. In the unlocked position, one or more (Continued)

spring loaded ejectors are permitted to eject the computing device from the base.

11 Claims, 12 Drawing Sheets

(56) References Cited

U.S. PATENT DOCUMENTS

| | | | | |
|---|---|---|---|---|
| 7,380,143 | B2* | 5/2008 | Gold | G06F 1/1632 |
| | | | | 713/340 |
| 7,405,929 | B1* | 7/2008 | Chuang | H01R 13/633 |
| | | | | 439/352 |
| 8,526,197 | B2* | 9/2013 | Takashima | F16M 11/04 |
| | | | | 361/679.01 |
| 9,170,609 | B2* | 10/2015 | Yaojun | G06F 1/1632 |
| 9,213,373 | B2* | 12/2015 | Lin | G06F 1/1669 |
| 9,229,479 | B2* | 1/2016 | Han | G06F 1/1681 |
| 9,335,792 | B2* | 5/2016 | Matsumoto | G06F 1/166 |
| 9,389,644 | B2* | 7/2016 | Kim | G06F 1/1632 |
| 9,396,861 | B2* | 7/2016 | Liang | H01F 7/20 |
| 9,442,527 | B2* | 9/2016 | Schmidt | G06F 1/1632 |
| 9,567,776 | B2* | 2/2017 | Moock | E05B 73/0082 |
| 9,665,125 | B2* | 5/2017 | Browning | G06F 1/1654 |
| 9,668,370 | B1* | 5/2017 | Huang | H05K 5/0217 |
| 9,727,083 | B2* | 8/2017 | Chamberlin | G06F 1/1632 |
| 9,778,695 | B1* | 10/2017 | Shibayama | G06F 1/1679 |
| 10,156,868 | B2* | 12/2018 | Iwamoto | G06F 1/1632 |
| 10,555,427 | B2* | 2/2020 | Kurumaddali | G06F 1/184 |
| 11,246,233 | B2* | 2/2022 | Venkatesh | H05K 5/0234 |
| 11,941,957 | B2* | 3/2024 | Marszalek | G07C 9/00944 |
| 2004/0012922 | A1* | 1/2004 | Kamphuis | G06F 1/1632 |
| | | | | 361/679.02 |
| 2006/0066438 | A1* | 3/2006 | Altounian | G06F 21/86 |
| | | | | 340/5.21 |
| 2009/0161303 | A1 | 6/2009 | Hirota | |
| 2010/0172108 | A1 | 7/2010 | Yang | |
| 2010/0265652 | A1* | 10/2010 | Agata | G06F 1/1632 |
| | | | | 361/679.41 |
| 2012/0025051 | A1* | 2/2012 | Nishiyama | G06F 1/1632 |
| | | | | 248/346.03 |
| 2015/0092333 | A1 | 4/2015 | Kim | |

* cited by examiner

SECURE ELECTROMAGNETIC DOCKING SYSTEM

BACKGROUND

Mobile computing devices and other portable electronic devices are vulnerable to theft due to their relatively high value, low weight, and small size. Locking devices can discourage opportunistic grab-and-run thefts of equipment from public locations such as coffee shops or libraries. Many such locking devices include a cable that can be cut with wire or bolt cutters and a lock mechanism, which is typically a tubular pin tumbler lock, a flat key lock, or a numeric combination lock with no key, any of which can be picked with sufficient time and knowledge of a would-be thief.

For example, a Kensington Security Slot (also K-Slot or Kensington lock) is part of an anti-theft system that includes a small, metal-reinforced hole found commonly on small or portable computers and electronics equipment such as laptops, computer monitors, desktop computers, gaming consoles, and video projectors. The K-Slot is combined with a metal anchor attached to a rubberized metal cable secured with a key or combination lock. The end of the cable has a small loop that allows the cable to be looped around a fixed object, such as a heavy table or other similar equipment, thereby securing the portable computer or electronics equipment to the fixed object.

SUMMARY

Implementations described and claimed herein provide an electromagnetic docking system comprising a base and a computing device. The base is attachable to a fixed structure and includes one or more catches, one or more ferromagnetic structures, the ferromagnetic structures biased to a locked position, and one or more spring loaded rising ejectors. The computing device includes one or more catch receptacles, each of which correspond to one of the catches, the catch receptacles to selectively engage the catches, and an electromagnet selectively powered to move the one or more ferromagnetic structures to an unlocked position. In the unlocked position, the one or more spring loaded rising ejectors are permitted to eject the computing device vertically away from the base.

Implementations described and claimed herein further provide an electromagnetic docking system comprising a base and a computing device. The base is attachable to a fixed structure and includes one or more catches, one or more locking apertures, and one or more spring loaded sliding ejectors. The computing device includes one or more ferromagnetic structures, the ferromagnetic structures biased to a locked position wherein each of the ferromagnetic structure are seated within one of the locking apertures, one or more catch receptacles, each of which correspond to one of the catches, the catch receptacles to selectively engage the catches, and an electromagnet selectively powered to move the one or more ferromagnetic structures to an unlocked position. In the unlocked position, the one or more spring loaded sliding ejectors are permitted to eject the computing device horizontally along the base.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

The presently disclosed secure electromagnetic docking systems are technically advantageous to prior art cable and lock mechanisms, such as K-slot systems, in that they provide a simplified locking interface for the user and improved security overall. Specifically, from a security standpoint, the presently disclosed electromagnetic locking mechanisms are hidden from view and access by a would-be thief, which is distinct from the generally accessible nature of prior art cable and lock mechanisms that are often not designed to be impervious protection measures, nor are they typically intended to secure equipment in unattended locations. Instead of being able to cut or otherwise forcibly remove a metal cable from a electromagnetically locked computing device, the would-be thief is forced to pry the locked computing device from a fixed object, which increases the risk of damage to the computing device and reducing its potential value should the attempted theft succeed. This results in technically advantageous security as compared to prior art cable and lock mechanisms.

From a user interface standpoint, the presently disclosed secure electromagnetic docking systems may be locked and unlocked via a graphical user interface (GUI), thereby eliminating a requirement that the user successfully secure a cable and lock mechanism to a computing device and a fixed object. This may improve the user experience by simplifying locking and unlocking efforts, providing visual and/or audio feedback to the user of successful locking and unlocking of the computing device, and reduce the possibility that the user incorrectly or insufficiently locks the computing device to the fixed object. The presently disclosed secure electromagnetic docking systems also omit a requirement that the user have access to a key and/or combination code to lock and unlock the computing device, either of which may be lost or inadvertently accessed by a would-be thief. This results in a technically advantageous user interface as compared to prior art cable and lock mechanisms.

Figure 1:
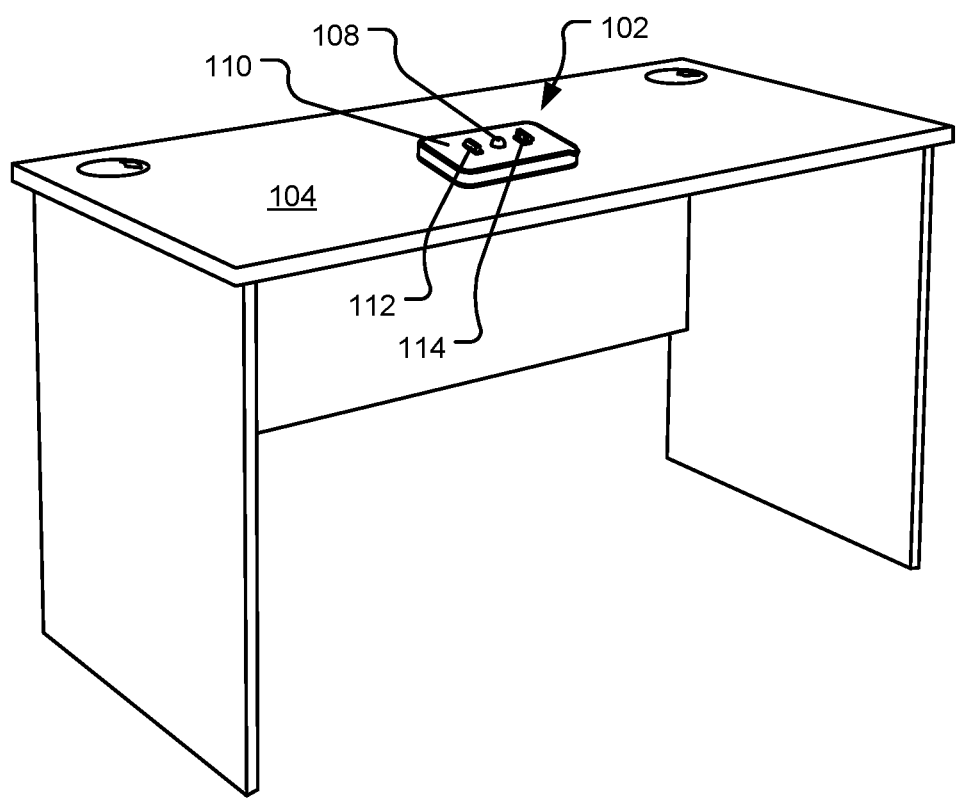
FIG. 1 illustrates an example base secured to a desk for a secure electromagnetic docking system with a rising ejector.
Figure 2A:
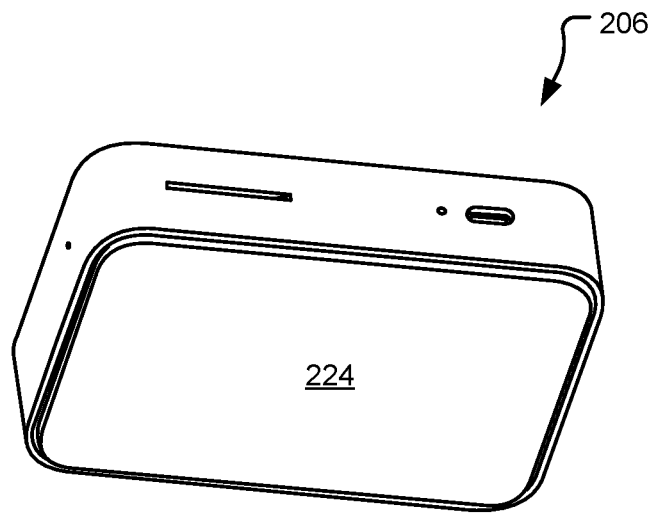
FIG. 2A illustrates an example computing device with a removable concealing foot hiding locking features for a secure electromagnetic docking system with a rising ejector.
Figure 2B:
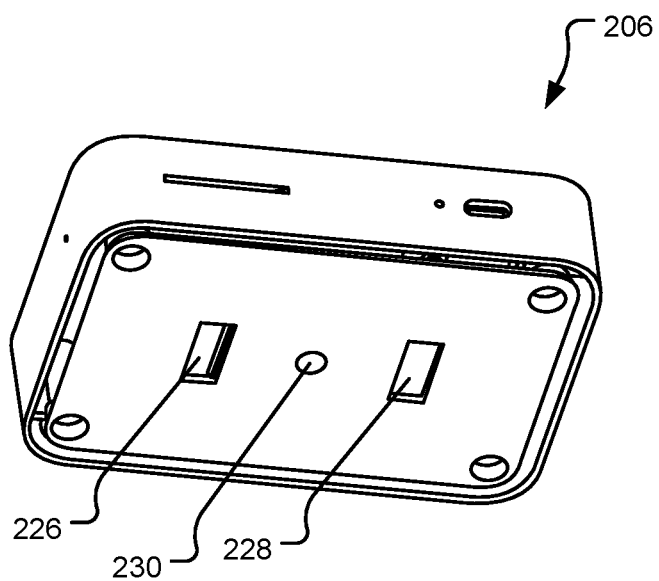
FIG. 2B illustrates the example computing device of FIG. 2A with the concealing foot removed and the locking features exposed.
Figure 3:
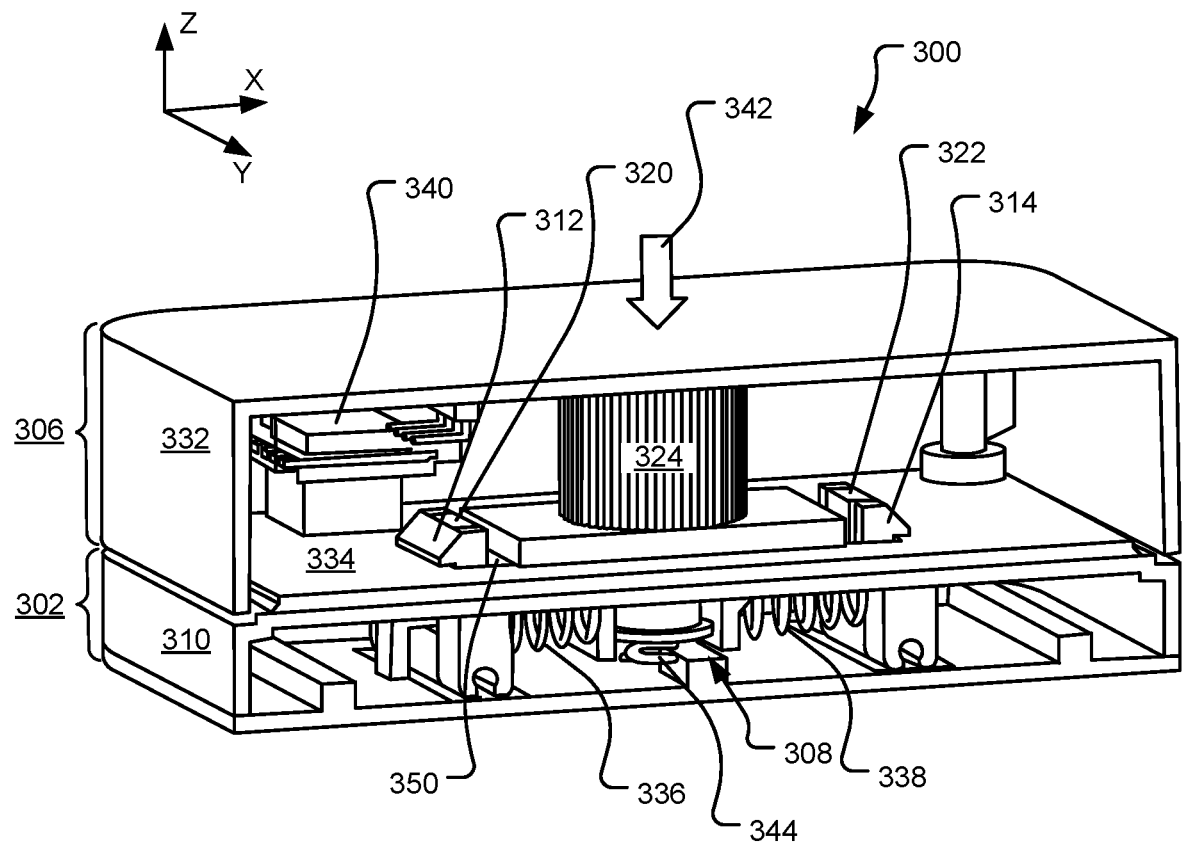
FIG. 3 illustrates internal components of an example secure electromagnetic docking system with a rising ejector in a locked orientation.

FIG. 1 illustrates an example base 102 secured to a desk 104 for a secure electromagnetic docking system (not shown, see e.g., secure electromagnetic docking system 300 of FIG. 3) with a rising ejector 108. The base 102 is a security fixture that may be selectively attached to a computing device (not shown, see e.g., computing device 206 of FIG. 2) in order to secure the computing device to the desk 104. The base 102 includes a generally prismatic body 110 that encloses a variety of internal components, which are discussed in further detail below with reference to FIGS. 3-5. Other implementations may utilize a different three-dimensional shape for the body 110 with the same or similar effect to that described below.

Spring-loaded barbs 112, 114, each serving as a catch for the computing device, protrude from corresponding catch apertures in the body 110. The spring-loaded barbs 112, 114 are biased to a locked position and serve to secure the computing device to the base 102 when the electromagnetic docking system is in a locked position. This is technically advantageous in that it allows the body 110 to remain secured to the base 102, even in the absence of electrical power, for example. The spring-loaded barbs 112, 114 include ferromagnetic structures (not shown, see e.g., ferromagnetic structures 320, 322 of FIG. 3) embedded therein that serve to render the spring-loaded barbs 112, 114 ferromagnetic and capable of being actuated in response to a force applied by a nearly electromagnet (not shown, see e.g., electromagnet 324 of FIG. 3). In other implementations, the barbs 112, 114 are ferromagnetic themselves without requiring a separate ferromagnetic structures. Further, other catches that deflect to engage the catch apertures, lock in place, and absent an unlocking force (e.g., that applied by the electromagnet) remain locked in place are contemplated herein.

The rising ejector 108 is spring loaded so that it may automatically eject the computing device vertically from the base 102 in response to the ferromagnetic structures being moved to an unlocked position by the electromagnet. This provides a visual (and perhaps audible) confirmation of a successful ejection to the user, which may be technically advantageous in that it improves the user experience. The rising ejector 108 is depicted as a hemispherical structure, though other shapes are contemplated herein. Further, while two barbs 112, 114 and one rising ejector 108 is explicitly shown and described, any number of barbs and rising ejectors may be used within the base 102 to achieve a desired level of security and overall performance.

The desk 104 is exemplary of any fixed object to which the base 102 may be permanently or semi-permanently adhered. Other example fixed objects include tables, walls, counter tops, vehicle interior or exterior panels, and other equipment that is not easily taken by the would-be thief due to their respective weights, permanent attachments, and/or separate security measures. The base 102 is permanently or semi-permanently adhered (e.g., via pressure-sensitive adhesive (PSA), bolted, screwed (e.g., via blind fasteners), or otherwise securely affixed to the desk 104. This permanently or semi-permanent attachment is designed such that it cannot be easily undone by a would-be thief of a corresponding computing device within a reasonable amount of time and using an expected amount of effort and tools, particularly without significantly damaging the computing device. For example, while the computing device may be pried from the desk 104 by the would-be thief, this would cause significant damage to the computing device, significantly reducing its resale value, and thus its value to the thief.

In various implementations, the base 102 functions as a tether to attach a computing device to the desk 104. A user is able to use the computing device while tethered to the desk, and then if the user has access, make a selection within a graphical user interface (GUI) within software running on the computing device to eject the computing device from the base 102 without requiring a key or combination lock code as in prior art solutions. In other implementations, a physical interface (e.g., a button or switch) can be used in place of the GUI. The user's selection software triggers the secure electromagnetic docking system to unlock without requiring the user to physically unlock the computing device, as is the case with prior art solutions that utilize a cable and padlock. This is technically advantageous in that the user experience is simplified, reducing difficulty in involved in locking and unlocking the computing device, and the potential for incorrect or insufficient locking of the computing device to the desk 104.

As the secure electromagnetic docking system is locked and unlocked via software, remote locking and unlocking is made possible. For example, a teacher in a classroom may remotely unlock a group of computing devices from their respective bases from a singular computing device at the end of a school day. Similarly, an information technology (IT) professional working for an organization may selectively unlock individual computing devices or groups of computing devices for replacement or repair, with or without the actual users of the computing devices being present or available.

FIG. 2A illustrates an example computing device 206 with a removable concealing foot 224 hiding locking features for a secure electromagnetic docking system (not shown, see e.g., secure electromagnetic docking system 300 of FIG. 3) with a rising ejector (not shown, see e.g., rising ejector 108 of FIG. 1). The computing device 206 may be any sort of computing device (e.g., a tablet computer, laptop computer, personal computer, gaming device, smart phone, or any other discrete device that receives physical user inputs and carries out one or more sets of arithmetic and/or logical operations), an input device for a computing device (e.g., a handheld controller, keyboard, trackpad, or mouse), or a device that is not necessarily related to computing at all (e.g., a vehicle component of controller, consumer electronics (e.g., cameras, telephones, and home appliances), medical devices, and industrial or commercial machinery) that is intended to be permanently or semi-permanently adhered to a fixed object (e.g., a desk).

Further examples of the presently disclosed technology may lock multiple computing devices together (one of which serves as the described base) or lock accessories to a computing device (e.g., a peripheral device, such as a stylus or an antennae). Still further, multiples of the presently disclosed computing device and base can be used together to stack a series of modules that in combination form an overall computing device. As a result, the computing device 206 and its associated base (not shown, see e.g., base 102 of FIG. 1) may each be any size and shape appropriate for the respective intended use case.

FIG. 2B illustrates the example computing device 206 of FIG. 2A with the concealing foot 224 removed and the locking features exposed. The concealing foot 224 is a removable layer that may be used to conceal locking features, such as catch receptacles 226, 228 and ejector seat 230, in the computing device 206 when the locking features are not in use. In some implementations, the concealing foot 224 may be a rubber or rubber-like material that is interference-fit or adhered to the bottom of the computing device 206 and peeled off when the locking features are to be accessed. In other implementations, the concealing foot 224 may be a rigid cover plate that is snapped, bolted, or screwed in place and unsnapped, unbolted, or unscrewed when the locking features are to be accessed.

In some implementations, the concealing foot 224 may be temporarily removed to access the locking features, and then replaced with the locking features are no longer needed (e.g., with magnets). In other implementations, the concealing foot 224 is permanently removed the first time that the locking features are accessed and never replaced, even when the locking features are no longer needed. Use of the concealing foot 224 is technically advantageous in that it may protect the locking features from damage from foreign objects and/or contamination from foreign particles, such as dirt or dust, when the locking features are not in use.

The catch receptacles 226, 228 correspond to catches (not shown, see e.g., spring-loaded barbs 112, 114 of FIG. 1) in the base, each of which automatically engages one of the catch receptacles 226, 228 when the computing device 206 is locked to the base and remains locked to the base absent an unlocking force applied by an electromagnet (referred to herein as selective engagement). While two catch receptacles 226, 228 and one ejector seat 230 is explicitly shown and described, any number of catch receptacles and ejector seats (corresponding to a number of barbs and rising ejectors in the base) may be used within the computing device 206 to achieve a desired level of security and overall performance.

The ejector seat 230 corresponds to an ejector (not shown, see e.g., rising ejector 108 of FIG. 1) that is spring loaded to eject the computing device 206 vertically away from the base. The ejector seat 230 allows the ejector to center the computing device 206 over the base as it centers in its ejector seat 230. The ejector/ejector seat 230 combination also may take up any looseness between the computing device 206 and the base when locked together and focuses a potential wear point within the ejector seat 230, which may have a coating or construction that reduces wear, or the appearance of wear.

In various implementations, one or both of the bases (e.g., base 102 of FIG. 1) and the computing devices (e.g., computing device 206 of FIG. 2) disclosed herein are sealed to meet IPX5 or IPX6 in solid particle protection and/or IPX7 or IPX8 in in liquid ingress protection around and through the catches, apertures, and other components of the secure interface between the base and the computing device.

For example, the various components of the latching mechanism may include plastic or rubber over molding or gaskets therebetween to seal the based and/or computing device. Such sealing is technically advantageous as it prevents a secure electromagnetic docking system from affecting an overall desired sealing capacity of the associated base and/or computing device.

FIG. 3 illustrates internal components of an example secure electromagnetic docking system 300 with a rising ejector 308 in a locked orientation. The secure electromagnetic docking system 300 includes a base 302 that is permanently or semi-permanently adhered to a fixed object (not shown, see e.g., desk 104 of FIG. 1) and a computing device 306 to be selectively locked to the base 302. To place the system 300 in the depicted locked orientation, a user presses the computing device 306 downward (in the negative z-direction, as illustrated by arrow 342) onto the base 302 until spring-loaded barbs 312, 314 lock in place, as described is further detail below.

The base 302 includes a generally prismatic body 310 that encloses a variety of internal components, which are discussed in further detail below. Similarly, the computing device 306 includes a generally prismatic body 332 that encloses a variety of additional internal components, which are discussed in further detail below. Other implementations may enclose the internal components in a different one of the bodies 310, 332 and/or utilize different three-dimensional shapes for one or both of the bodies 310, 332 with the same or similar effect to that described below.

The spring-loaded barbs 312, 314, each serving as a catch for the computing device 306, are rotatably connected to the body 310 and protrude through catch receptacles (e.g., catch receptacle 350) in the body 332. The spring-loaded barbs 312, 314 engage the body 332, which may include a reinforcing plate 334 (e.g., a metal reinforcement), in the depicted locked orientation. The reinforcing plate 334 may increase the resistance of the secure electromagnetic docking system 300 to being pried apart by a would-be thief of the computing device 306. The spring-loaded barbs 312, 314 are biased to the depicted locked position via springs 336, 338 within the base 302 and serve to secure the computing device 306 to the base 302 when the electromagnetic docking system 300 is in the depicted locked orientation.

An electromagnet 324 is provided within the body 332 of the computing device 306, which is selectively powered via a microcontroller, system on a chip (SoC), computer motherboard, or other electronic controller (collectively computing unit) 340 (also with the body 332). The computing unit 340 is directed by software running on the computing device 306 or another computing device. For example, the computing device 306 may be running software with a graphical user interface (GUI) that allows a user to easily shift the electromagnetic docking system 300 from a locked orientation (such as that depicted in FIG. 3) to an unlocked orientation (such as that depicted in FIG. 4). The user's selections within the GUI instructs the computing unit 340 to selectively power the electromagnet 324 on to unlock the system 300 and off to lock the system 300. Other implementations may selectively power the electromagnet 324 on to lock the system 300 and off to unlock the system 300.

The spring-loaded barbs 312, 314 include ferromagnetic structures 320, 322 embedded therein that serve to render the spring-loaded barbs 312, 314 ferromagnetic and capable of being actuated in response to a force applied by the electromagnet 324. In other implementations, the barbs 312, 314 are ferromagnetic themselves without requiring a separate ferromagnetic structures. The rising ejector 308 is spring-loaded to press upward or vertically (in the z-direction) on the computing device 306 when in the depicted locked orientation via spring 344 within the base 302. The rising ejector 308 may automatically eject the computing device vertically from the base 302 in response to the ferromagnetic structures being moved to an unlocked position by the electromagnet 324 (see FIG. 5).

Figure 4:
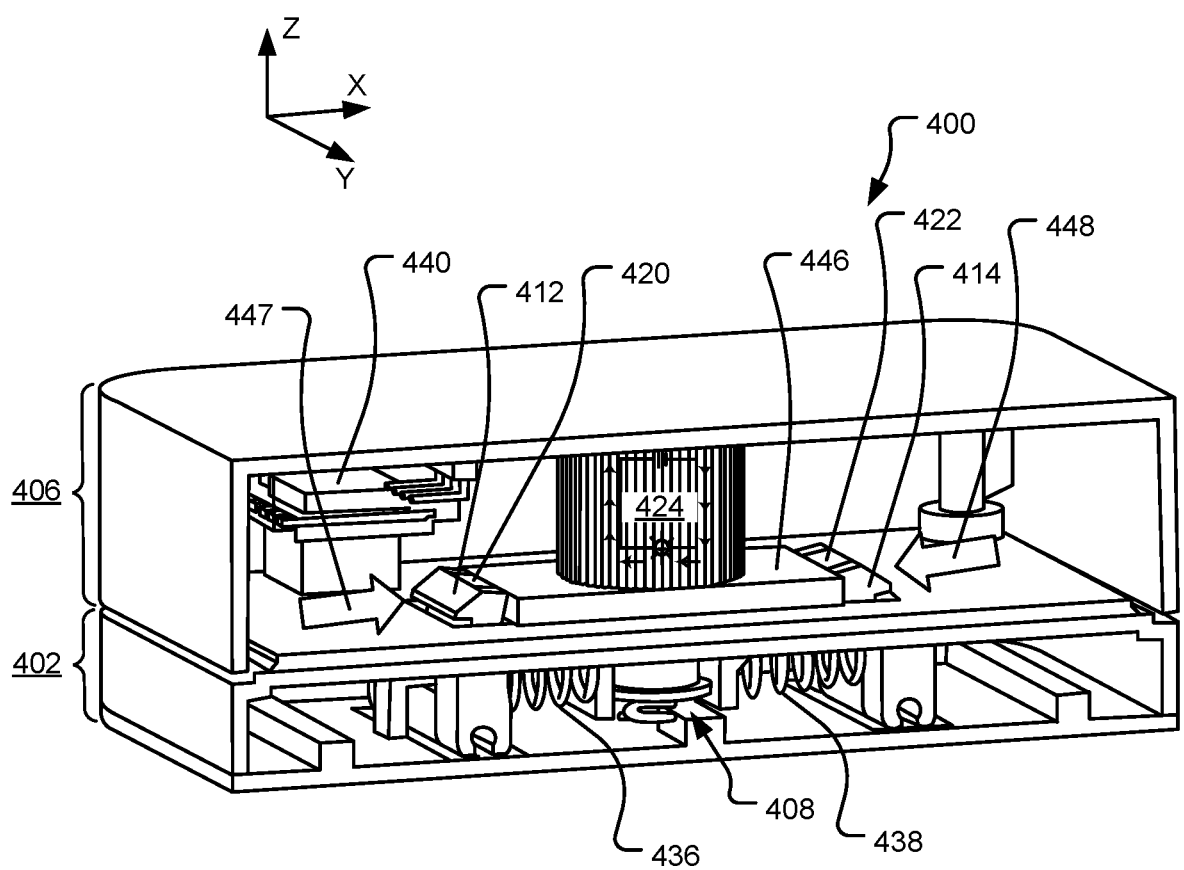
FIG. 4 illustrates internal components of an example secure electromagnetic docking system with a rising ejector in an unlocked orientation.

FIG. 4 illustrates internal components of an example secure electromagnetic docking system 400 with a rising ejector 408 in an unlocked orientation. The secure electromagnetic docking system 400 includes a base 402 that is permanently or semi-permanently adhered to a fixed object (not shown, see e.g., desk 104 of FIG. 1) and a computing device 406 to be selectively locked to the base 402. To release the system 400 from the locked position depicted in FIG. 3, a user may access a GUI running within software on the computing device 406 (or another computing device) and make a selection to unlock the system 400. In response, computing unit 440 powers electromagnet 424 to move spring-loaded barbs 412, 414 to their depicted unlocked position, as described in further detail below.

The spring-loaded barbs 412, 414, each serving as a catch for the computing device 406, are rotatably connected to the base 402 and protrude through catch receptacles in the computing device 406. The spring-loaded barbs 412, 414 are biased to a locked rotational position via springs 436, 438 and serve to secure the computing device 406 to the base 402 when the electromagnetic docking system 400 is in a locked orientation (see e.g., FIG. 3). The spring-loaded barbs 412, 414 include ferromagnetic structures 420, 422 embedded therein that serve to render the spring-loaded barbs 412, 414 ferromagnetic and capable of being actuated in response to a force applied by the electromagnet 424. In other implementations, the barbs 412, 414 are ferromagnetic themselves without requiring a separate ferromagnetic structures.

In the depicted unlocked orientation, the electromagnet 424 is powered by the computing unit 440 to magnetize ferromagnetic plate 446 (e.g., a plate containing a significant quantity of iron). The ferromagnetic plate 446 applies a sufficient force of attraction to the spring-loaded barbs 412, 414 to overcome the springs 436, 438 and move the spring-loaded barbs 412, 414 (by virtue of their ferromagnetic structures) to their depicted unlocked positions adjacent the ferromagnetic plate 446, as illustrated by arrows 447, 448. Based at least on being powered, the electromagnet 424 holds the spring-loaded barbs 412, 414 in their depicted unlocked positions so long as the system 400 is to be maintained in an unlocked orientation. In the unlocked orientation, the rising ejector 408 is permitted to eject the computing device 406 vertically (in the z-direction) away from the base 402, as discussed in further detail below with reference to FIG. 5.

Figure 5:
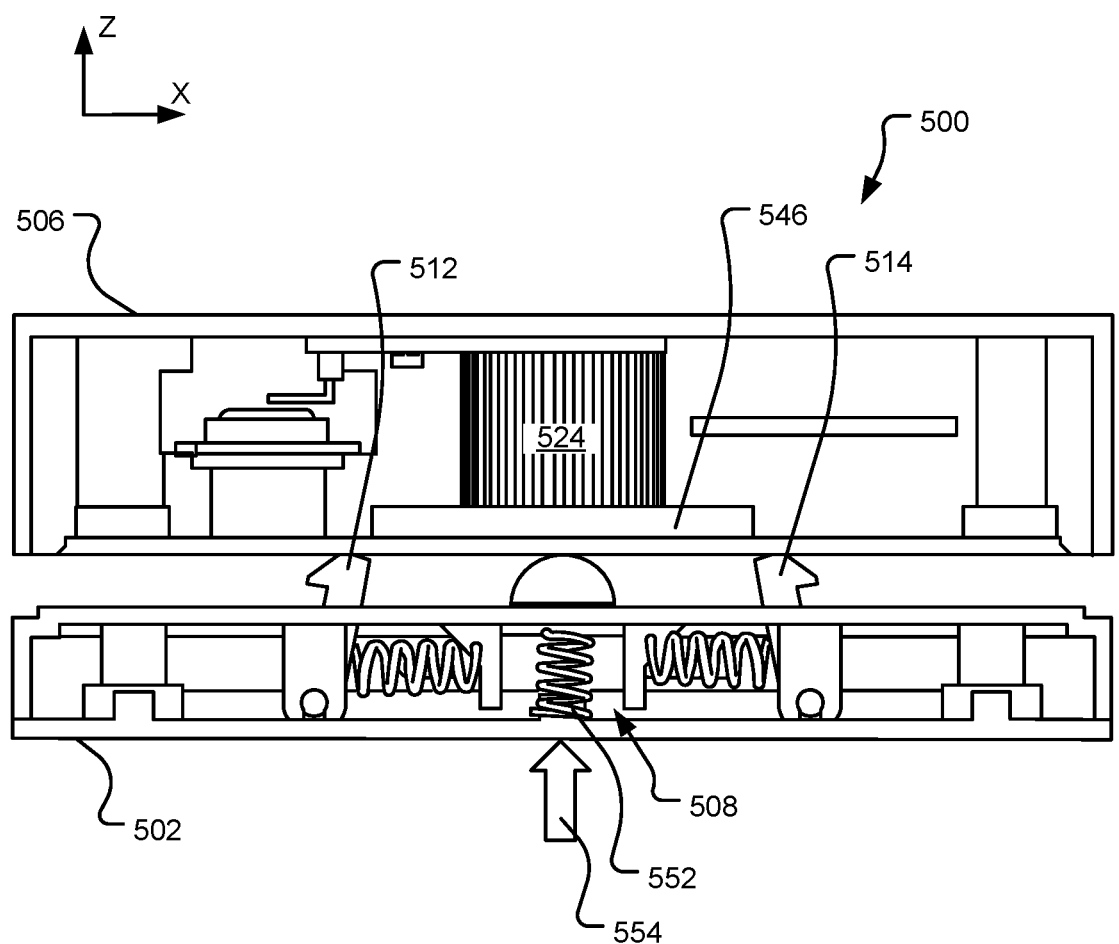
FIG. 5 illustrates internal components of an example secure electromagnetic docking system with a rising ejector in an released orientation.

FIG. 5 illustrates internal components of an example secure electromagnetic docking system 500 with a rising ejector 508 in an released orientation. The secure electromagnetic docking system 500 includes a base 502 that is permanently or semi-permanently adhered to a fixed object (not shown, see e.g., desk 104 of FIG. 1) and a computing device 506 to be selectively locked to the base 502. To release the system 500 from the locked position depicted in FIG. 3, a user may access a GUI running within software on the computing device 506 (or another computing device) and make a selection to unlock the system 500. In response, electromagnet 524 moves spring-loaded barbs 512, 514 to their depicted unlocked position.

The spring-loaded barbs 512, 514, each serving as a catch for the computing device 506, are rotatably connected to the base 502 and protrude through catch receptacles in the computing device 506. The spring-loaded barbs 512, 514 are biased to a locked rotational position and serve to secure the computing device 406 to the base 402 when the electromagnetic docking system 400 is in a locked orientation (see e.g., FIG. 3). The spring-loaded barbs 512, 514 include ferromagnetic structures (not shown, see e.g., ferromagnetic structures 320, 322 of FIG. 3) embedded therein that serve to render the spring-loaded barbs 512, 514 ferromagnetic and capable of being actuated in response to a force applied by the electromagnet 524.

In the depicted unlocked orientation, the electromagnet 524 is powered to magnetize ferromagnetic plate 546. Based at least on the electromagnet 524 being powered, the ferromagnetic plate 546 applies a sufficient force of attraction to the spring-loaded barbs 512, 514 to disengage the spring-loaded barbs 512, 514 from the computing device 506 and move the spring-loaded barbs 512, 514 (by virtue of their ferromagnetic structures) to their depicted unlocked positions. The powered electromagnet 524 holds the spring-loaded barbs 512, 514 in their depicted unlocked positions so long as the system 500 is to be maintained in an unlocked orientation and as the computing device 506 is ejected from the base 502.

The rising ejector 508 is spring-loaded via ejector spring 552 to press upward or vertically (in the z-direction) on the computing device 506 as it is ejected from the base 502, as illustrated by arrow 554. The rising ejector 508 may automatically eject the computing device 506 vertically from the base 502 in response to the ferromagnetic structures being moved to an unlocked position by the electromagnet 524.

Figure 6:
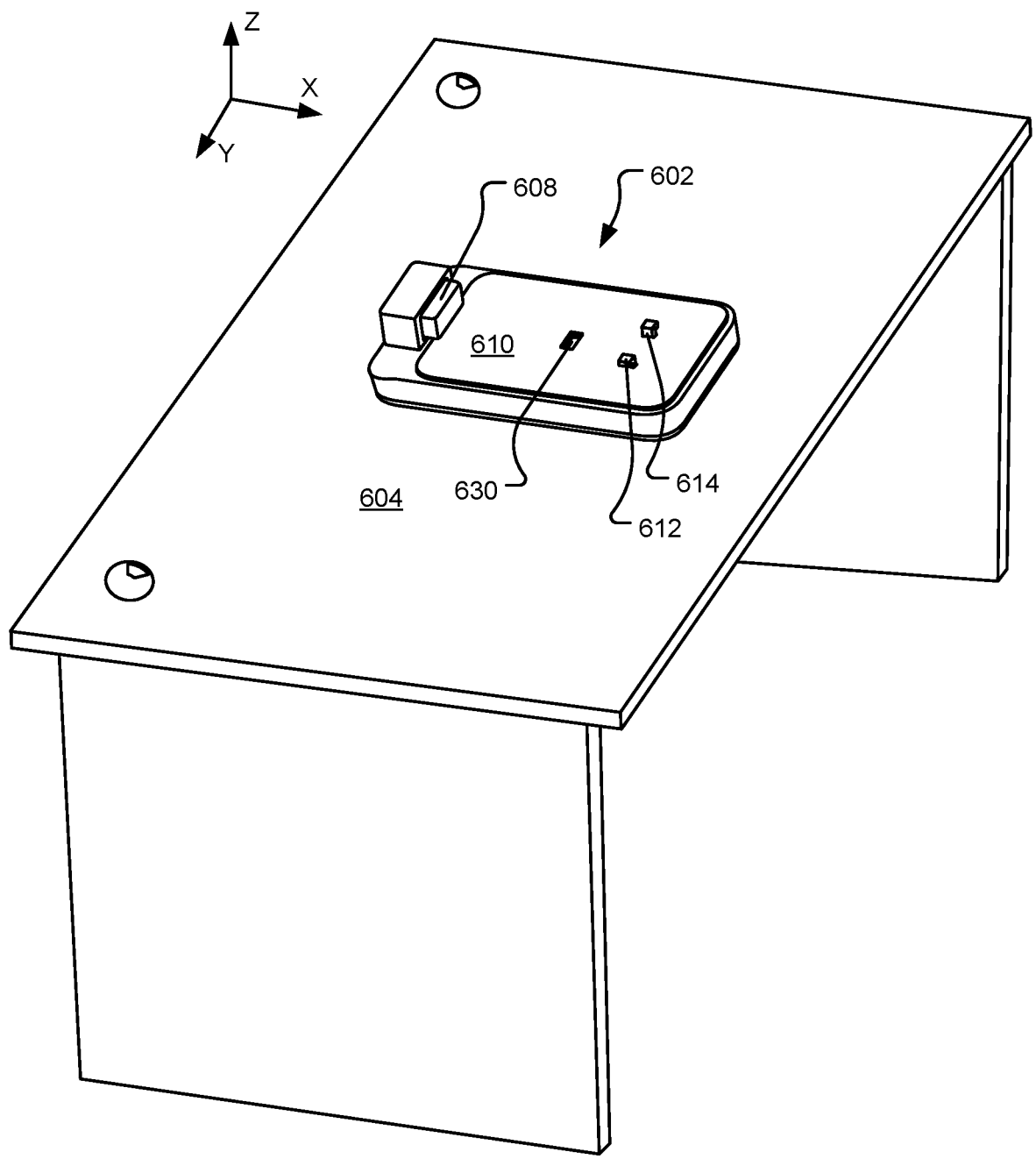
FIG. 6 illustrates an example base secured to a desk for a secure electromagnetic docking system with a sliding ejector.
Figure 7A:
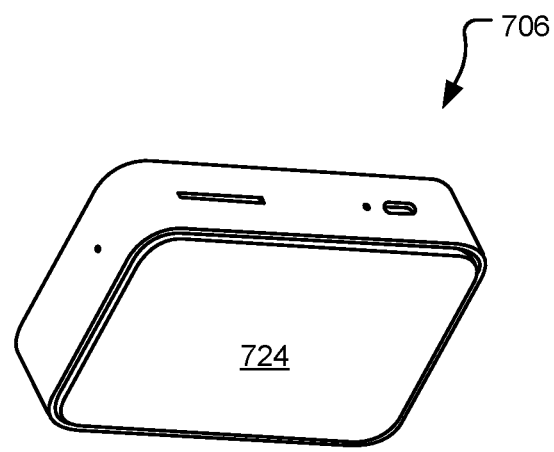
FIG. 7A illustrates an example computing device with a removable concealing foot hiding locking features for a secure electromagnetic docking system with a sliding ejector.
Figure 7B:
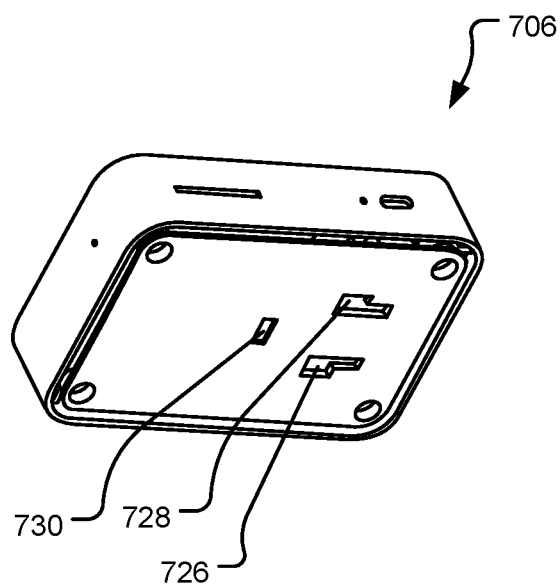
FIG. 7B illustrates the example computing device of FIG. 7A with the concealing foot removed and the locking features exposed.
Figure 8:
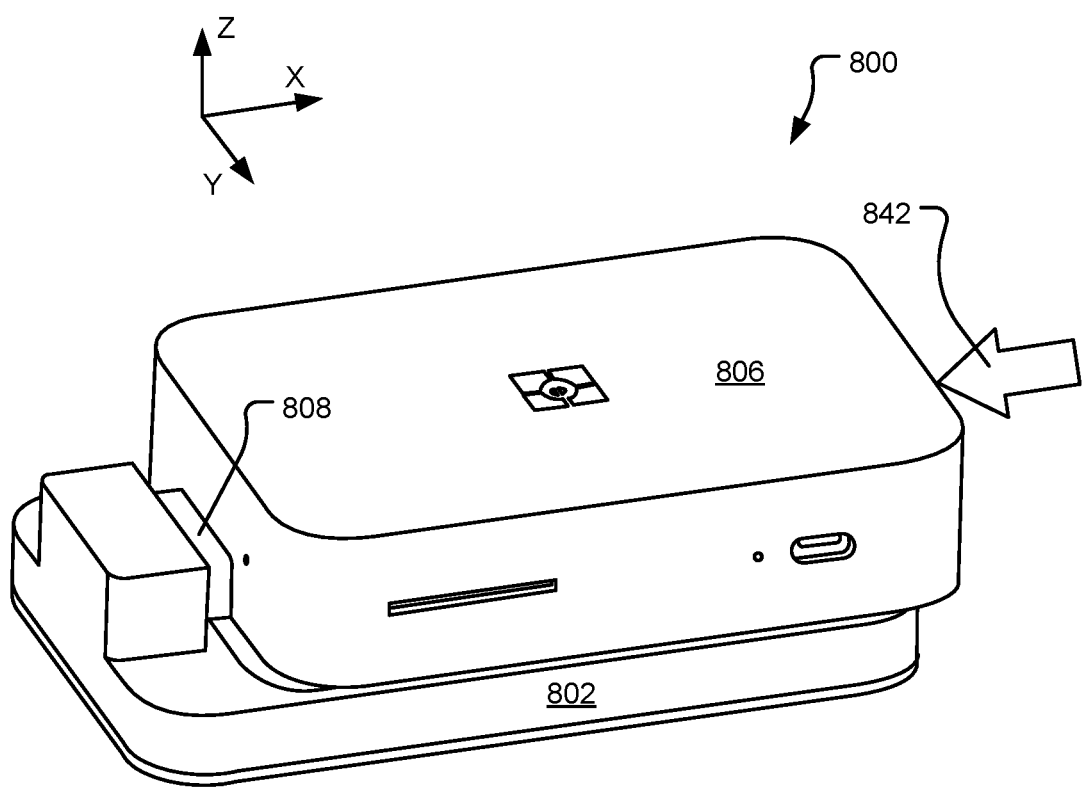
FIG. 8 illustrates an example computing device being locked to an example base for a secure electromagnetic docking system with a sliding ejector.

FIG. 6 illustrates an example base 602 secured to a desk 604 for a secure electromagnetic docking system (not shown, see e.g., secure electromagnetic docking system 800 of FIG. 8) with a sliding ejector 608. The base 602 is a security fixture that may be selectively attached to a computing device (not shown, see e.g., computing device 706 of FIG. 7) in order to secure the computing device to the desk 604. The base 602 includes a generally prismatic body 610 that encloses a variety of internal components, which are discussed in further detail below with reference to FIGS. 7-11. Other implementations may utilize a different three-dimensional shape for the body 610 with the same or similar effect to that described below.

Fixed catches 612, 614 protrude from the body 610 and are hook shaped to engage with corresponding catch receptacles (not shown, see e.g., catch receptacles 726, 728 of FIG. 7) in a corresponding computing device to lock the computing device to the base 602 in the z-direction when the computing device is slid into place on the base 602. Additionally, when the computing device is slid into place on the base 602, a ferromagnetic structure (not shown, see e.g., ferromagnetic pin 920 of FIG. 9), such as a pin with a rectangular or circular cross section drops from an aperture in the computing device into a locking aperture 630 in the base 602 via gravity, spring force, and/or magnetic attraction to hold the computing device in place. Implementations that utilize gravity may be technically advantageous in that they reduce part count by not requiring springs or other mechanisms to apply a biasing force to the ferromagnetic structure. The ferromagnetic structure locks the computing device to the base 602 in the x-y plane when the computing device is slid into place on the base 602 and the ferromagnetic structure is in its extended (and locked) position. In a retracted (and unlocked) position, the ferromagnetic structure is retracted out of the locking aperture 630 using an electromagnet (not shown, see e.g., electromagnet 924 of FIG. 9) and into its aperture in the computing device.

The sliding ejector 608 is spring loaded so that it may automatically eject the computing device horizontally (in the x-direction) from the base 102 when the ferromagnetic structure is retracted out of the locking aperture 630 and moved to its unlocked position by the electromagnet. This provides a visual (and perhaps audible) confirmation of a successful ejection to the user, which may be technically advantageous in that it improves the user experience. Horizontal ejection and vertical ejection (discussed above) may have similar technical effects, but one may be more convenient to use than the other based on the arrangement of components within the base 602. The rising ejector 608 is depicted as a prismatic structure, though other shapes are contemplated herein. Further, while two fixed catches 612, 614 and one sliding ejector 608 is explicitly shown and described, any number of fixed catches and sliding ejectors may be used within the base 602 to achieve a desired level of security and overall performance.

The desk 604 is exemplary of any fixed object to which the base 602 may be permanently or semi-permanently adhered. Further details regarding the base 602 and the desk 604 may be as described above with reference to base 102 and desk 104, respectively, of FIG. 1.

FIG. 7A illustrates an example computing device 706 with a removable concealing foot 724 hiding locking features for a secure electromagnetic docking system (not shown, see e.g., secure electromagnetic docking system 800 of FIG. 8) with a sliding ejector (not shown, see e.g., sliding ejector 608 of FIG. 1). The computing device 706 may be any sort of computing device, an input device for a computing device, or a device that is not necessarily related to computing at all that is intended to be permanently or semi-permanently adhered to a fixed object.

Further examples of the presently disclosed technology may lock multiple computing devices together (one of which serves as the described base) or lock accessories to a computing device (e.g., a peripheral device, such as a stylus or an antennae). Still further, multiples of the presently disclosed computing device and base can be used together to stack a series of modules that in combination form an overall computing device. As a result, the computing device 706 and its associated base (not shown, see e.g., base 602 of FIG. 6) may each be any size and shape appropriate for the respective intended use case.

FIG. 7B illustrates the example computing device 706 of FIG. 7A with the concealing foot 724 removed and the locking features exposed. The concealing foot 724 is a removable layer that may be used to conceal locking features, such as catch receptacles 726, 728 and ferromagnetic structure aperture 730, in the computing device 706 when the locking features are not in use. The catch receptacles 726, 728 correspond to catches (not shown, see e.g., fixed catches 612, 614 of FIG. 6) in the base, each of which selectively engages one of the catch receptacles 726, 728 when the computing device 706 is locked to the base.

The ferromagnetic structure aperture 730 is used to selectively extend a ferromagnetic structure (e.g., ferromagnetic pin 920 of FIG. 9) from the computing device 706. The ferromagnetic structure drops from the ferromagnetic structure aperture 730 in the computing device 706 into a locking aperture (not shown, se e.g., locking aperture 630 of FIG. 6) in the base via gravity, spring force, and/or magnetic attraction to hold the computing device in place to achieve a locked orientation.

While two catch receptacles 726, 728 and one ferromagnetic structure aperture 730 are explicitly shown and described, any number of catch receptacles and ferromagnetic structure apertures (corresponding to a number of fixed catches and ferromagnetic structures in the base) may be used within the computing device 706 to achieve a desired level of security and overall performance. Further details regarding the computing device 706 may be as described above with reference to the computing device 206 of FIGS. 2A & 2B.

FIG. 8 illustrates an example computing device 806 being locked to an example base 802 for a secure electromagnetic docking system 800 with a sliding ejector 808. The base 802 is permanently or semi-permanently adhered to a fixed object (not shown, see e.g., desk 604 of FIG. 6) and the computing device 806 is selectively locked to the base 802. To place the system 800 in a locked orientation, a user slides the computing device 806 across the base 802 (in the negative x-direction, as illustrated by arrow 842) until the spring-loaded sliding ejector 808 compresses and a ferromagnetic structure (e.g., ferromagnetic pin 920 of FIG. 9) drops from the computing device 806 into a locking aperture (not shown, se e.g., locking aperture 630 of FIG. 6) in the base 802 to hold the computing device 706 in place over the base 802 to achieve a locked orientation. While locked, pressure from the ejector 808 may take up any looseness between the computing device 806 and the base 802.

Figure 9:
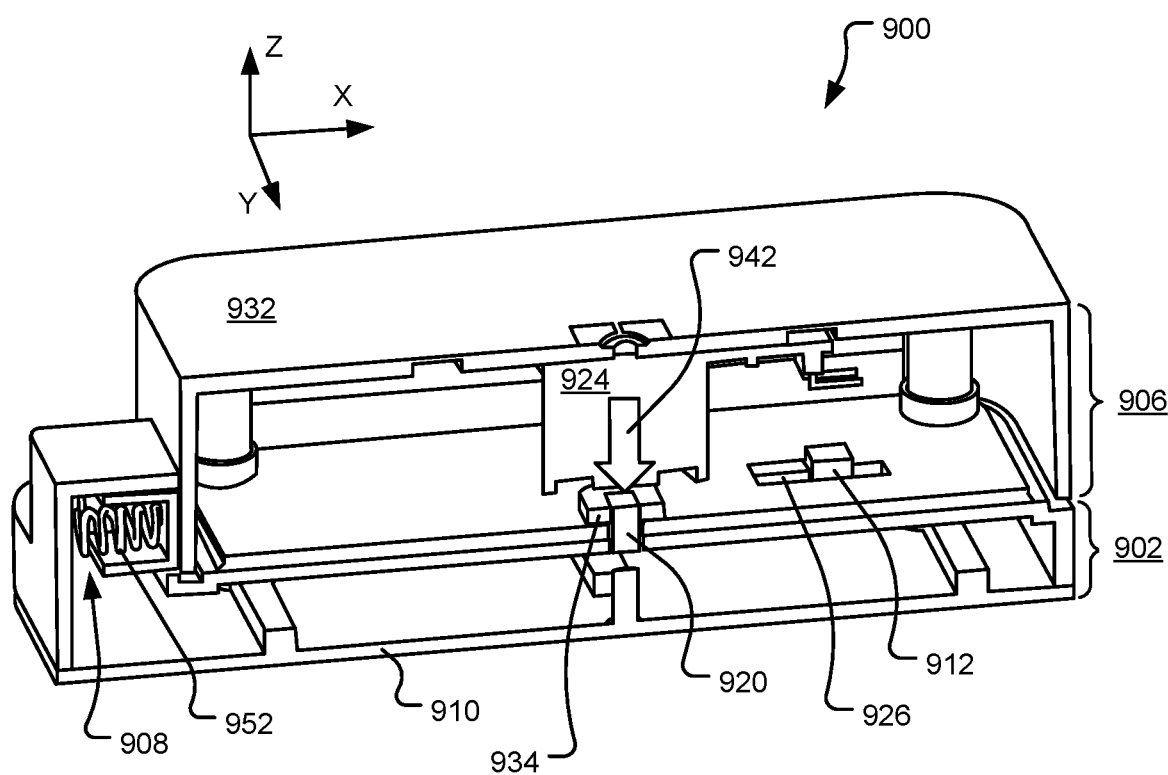
FIG. 9 illustrates internal components of an example secure electromagnetic docking system with a sliding ejector in a locked orientation.

FIG. 9 illustrates internal components of an example secure electromagnetic docking system 900 with a sliding ejector 908 in a locked orientation. The secure electromagnetic docking system 900 includes a base 902 that is permanently or semi-permanently adhered to a fixed object (not shown, see e.g., desk 604 of FIG. 6) and a computing device 906 to be selectively locked to the base 902. To place the system 900 in the depicted locked orientation, a user slides the computing device 906 across the base 902 (in the negative x-direction) until a ferromagnetic structure, such as ferromagnetic pin 920, locks in place, as described is further detail below.

The base 902 includes a generally prismatic body 910 that encloses a variety of internal components, which are discussed in further detail below. Similarly, the computing device 906 includes a generally prismatic body 932 that encloses a variety of additional internal components, which are discussed in further detail below. Other implementations may enclose the internal components in a different one of the bodies 910, 932 and/or utilize different three-dimensional shapes for one or both of the bodies 910, 932 with the same or similar effect to that described below.

When slid into the depicted locked orientation, catches (e.g., fixed catch 912) extending from the base 902 engage catch receptacles (e.g., catch receptacle 926) in the computing device 906. The hook shape of the catches is technically advantageous in that they hold the computing device 906 in place over the base 902 and prevent movement in the y-direction and the z-direction. Other shapes of the catches are contemplated herein that achieve a similar technical effect. As the computing device 906 is slid into the depicted locked orientation over the base 902, a ferromagnetic structure aperture in the computing device 906 aligns with a locking aperture in the base 902. This alignment permits the ferromagnetic pin 920 to drop through the ferromagnetic structure aperture in the computing device 906 and into the locking aperture in the base 902, as illustrated by arrow 942, thereby locking the computing device 906 to the base 902 and preventing movement in the x-direction. The ferromagnetic pin 920 drops by force of gravity, spring force, and/or magnetic attraction to achieve the locked orientation.

The computing device 906 may include a boss 934 (e.g., a metal reinforcement) as a part of the ferromagnetic pin 920 and to increase its magneticity. In other implementations, the boss 934 is separate from the ferromagnetic pin 920 and serves to guide the ferromagnetic pin 920 and reinforce the ferromagnetic structure aperture against deflection. This may increase the resistance of the secure electromagnetic docking system 900 to being pried apart by a would-be thief of the computing device 906.

An electromagnet 924 is provided within the body 932 of the computing device 906, which is selectively powered via a computing unit (not shown, see e.g., computing unit 340 of FIG. 3), which is also with the body 932. The computing unit is directed by software running on the computing device 906 or another computing device. For example, the computing device 906 may be running software with a graphical user interface (GUI) that allows a user to easily shift the electromagnetic docking system 900 from a locked orientation (such as that depicted in FIG. 9) to an unlocked orientation (such as that depicted in FIG. 11). The user's selections within the GUI instructs the computing unit to selectively power the electromagnet 924 on to unlock the system 900 and off to lock the system 900. Other implementations may selectively power the electromagnet 924 on to lock the system 300 and off to unlock the system 900.

The ferromagnetic pin 920 is capable of being actuated upward (e.g., in the z-direction) in response to a force applied by the electromagnet 924 to unlock the system 900. Other implementations may actuate the ferromagnetic pin 920 in directions other than the z-direction and still take advantage of gravity if there is a z-direction component of the actuation. The force applied by the electromagnet 924 is sufficient to overcome the force of gravity, spring force, and/or magnetic attraction that causes the ferromagnetic pin 920 to drop into the locking aperture in the locked orientation. The sliding ejector 908 is spring-loaded to press horizontally (in the x-direction) on the computing device 906 when in the depicted locked orientation via spring 952 within the base 902. The sliding ejector 908 may automatically eject the computing device horizontally from the base 902 in response to the ferromagnetic pin 920 being moved to an unlocked position by the electromagnet 924 (see FIG. 11).

Figure 10:
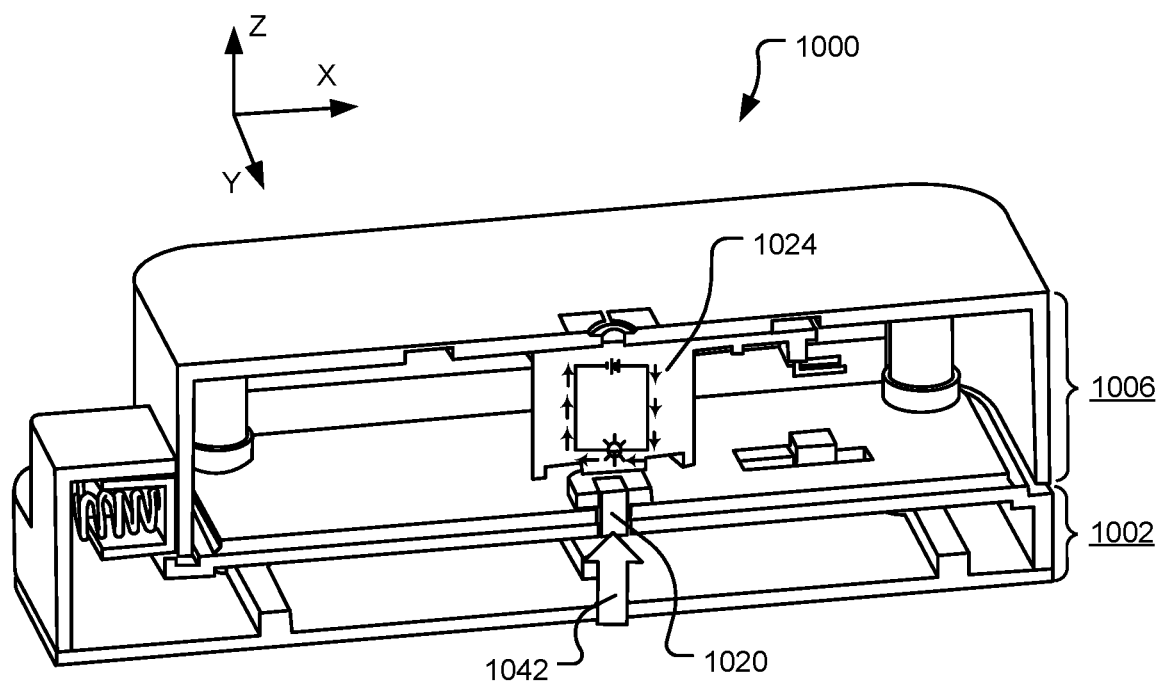
FIG. 10 illustrates internal components of an example secure electromagnetic docking system with a sliding ejector with an electromagnet initiating an unlocking mechanism.

FIG. 10 illustrates internal components of an example secure electromagnetic docking system 1000 with an electromagnet 1024 initiating an unlocking mechanism. The secure electromagnetic docking system 1000 includes a base 1002 that is permanently or semi-permanently adhered to a fixed object (not shown, see e.g., desk 604 of FIG. 6) and a computing device 1006 to be selectively locked to the base 1002. To release the system 1000 from the locked position depicted in FIG. 9, a user may access a GUI running within software on the computing device 1006 (or another computing device) and make a selection to unlock the system 1000. In response, a computing unit (not shown, see e.g., computing unit 440 of FIG. 4) powers electromagnet 1024 to move ferromagnetic pin 1020 to an unlocked position as depicted in FIG. 11, and as described in further detail below.

The unlocking mechanism includes a ferromagnetic pin 1020 (or other ferromagnetic locking structure) that protrudes through a ferromagnetic structure aperture in the computing device 1006 and a locking aperture in the base 1002. The ferromagnetic pin 1020 is biased to a locked position via gravity, spring force (via a biasing spring, not illustrated), and/or magnetic attraction (via a permeant magnet, not illustrated) to hold the computing device 1006 in place to achieve a locked orientation. The locking bias of the ferromagnetic pin 1020 is capable of being overcome by a force applied by the electromagnet 1024. In other implementations, the ferromagnetic pin 1020 is a permeant magnet that creates its own bias by being attracted to ferromagnetic materials in the base 1002 or repelled by ferromagnetic materials in the computing device 1006.

To achieve an unlocked orientation, the electromagnet 1024 is powered by the computing unit to lift the ferromagnetic pin 1020 out of the locking aperture in the base 1002, as illustrated by arrow 1042. Based at least on being powered, the electromagnet 1024 holds the ferromagnetic pin 1020 in the unlocked position (e.g., see FIG. 11) so long as the system 1000 is to be maintained in the unlocked orientation.

Figure 11:
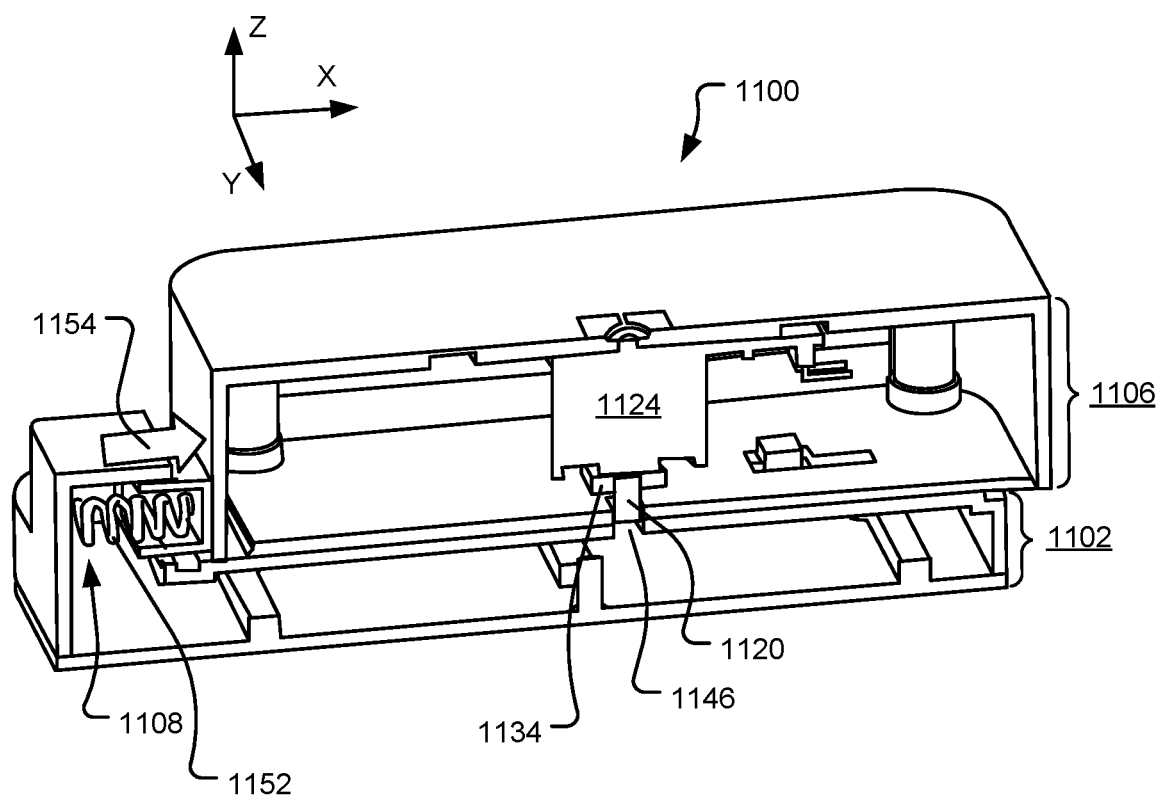
FIG. 11 illustrates internal components of an example secure electromagnetic docking system with a sliding ejector in an released orientation.

FIG. 11 illustrates internal components of an example secure electromagnetic docking system 1100 with a sliding ejector 1108 in an released orientation. The secure electromagnetic docking system 1100 includes a base 1102 that is permanently or semi-permanently adhered to a fixed object (not shown, see e.g., desk 604 of FIG. 6) and a computing device 1106 to be selectively locked to the base 1102. To release the system 1100 from the locked position depicted in FIG. 10, a user may access a GUI running within software on the computing device 1106 (or another computing device) and make a selection to unlock the system 1100. In response, a computing unit (not shown, see e.g., computing unit 440 of FIG. 4) powers electromagnet 1124 to move ferromagnetic pin 1120 to the depicted unlocked position, as described in further detail below.

In the locked position (see e.g., FIG. 10), the ferromagnetic pin 1120 (or other ferromagnetic locking structure) protrudes through a ferromagnetic structure aperture in the computing device 1106 and a locking aperture 1146 in the base 1102. The ferromagnetic pin 1120 is biased to the locked position via gravity, spring force (via a biasing spring, not illustrated), and/or magnetic attraction (via a permeant magnet, not illustrated) to hold the computing device 1106 in place to achieve a locked orientation. The locking bias of the ferromagnetic pin 1120 is capable of being overcome by a force applied by the electromagnet 1124. In other implementations, the ferromagnetic pin 1120 is a permeant magnet that creates its own bias by being attracted to ferromagnetic materials in the base 1102 or repelled by ferromagnetic materials in the computing device 1106.

In the depicted unlocked orientation, the electromagnet 1124 is powered by the computing unit to lift the ferromagnetic pin 1120 (and in some implementations, an associated boss 1134) out of the locking aperture 1146 in the base 1102. The powered electromagnet 1124 holds the ferromagnetic pin 1120 in the depicted unlocked position so long as the system 1100 is to be maintained in the unlocked orientation and as the computing device 1106 is ejected from the base 1102.

The sliding ejector 1108 is spring-loaded via ejector spring 1152 to press horizontally (in the x-direction) on the computing device 1106 as it is ejected from the base 1102, as illustrated by arrow 1154. The sliding ejector 1108 may automatically eject the computing device 1106 horizontally from the base 1102 in response to the ferromagnetic pin 1120 being moved to its unlocked position by the electromagnet 1124.

While at least the electromagnet and its computing unit are depicted throughout the Figures and described above as included within the computing device, the orientation of the electromagnet and its computing unit, as well as the remaining components of the base and the computing device may be reversed in various implementation. This may require that the base be powered. This can be achieved by a separate power supply to the base, or an electrical connection between the base and the computing device (e.g., via pogo pins or an inductive connection). If an electrical connection is established with the base and the computing device, power may flow in either direction between the base and the computing device. As a result, the base then may serve as a power supply to the computing device, or vice versa. Further, other signals providing other features may be ran from a powered base to the computing device 1106 or other associated component (e.g., connecting additional peripherals, speakers, Data I/O, etc.).

Further, the secure locking mechanisms disclosed herein are generally biased to a locked position without application of power (normally locked). This allows the secure electromagnetic docking system to remain locked, even if power is removed from the computing device and/or the base. This also reduces overall power consumption as the locking mechanism for the computing device and/or the base is only powers for the brief period that the computing device is removed from the base. While normally unlocked secure electromagnetic docking systems are also contemplated herein, an additional mechanism that ensures constant application of power to the computing device and/or base while the secure electromagnetic docking system is locked may be required.

In various example implementations, the base 102 of FIG. 1, the base 602 of FIG. 2, or any other base contemplated herein is 80-160 mm long, 40-80 mm wide, and 5-30 mm tall, as examples only. XYZ coordinates are provided throughout the Figures to aid the detailed description, but do not limit the scope of the presently disclosed technology. In other implementations, features illustrated and described above with reference to specific Figures may be used in different combinations than that explicitly shown in each of the Figures and described with specific reference to each of the Figures.

Figure 12:
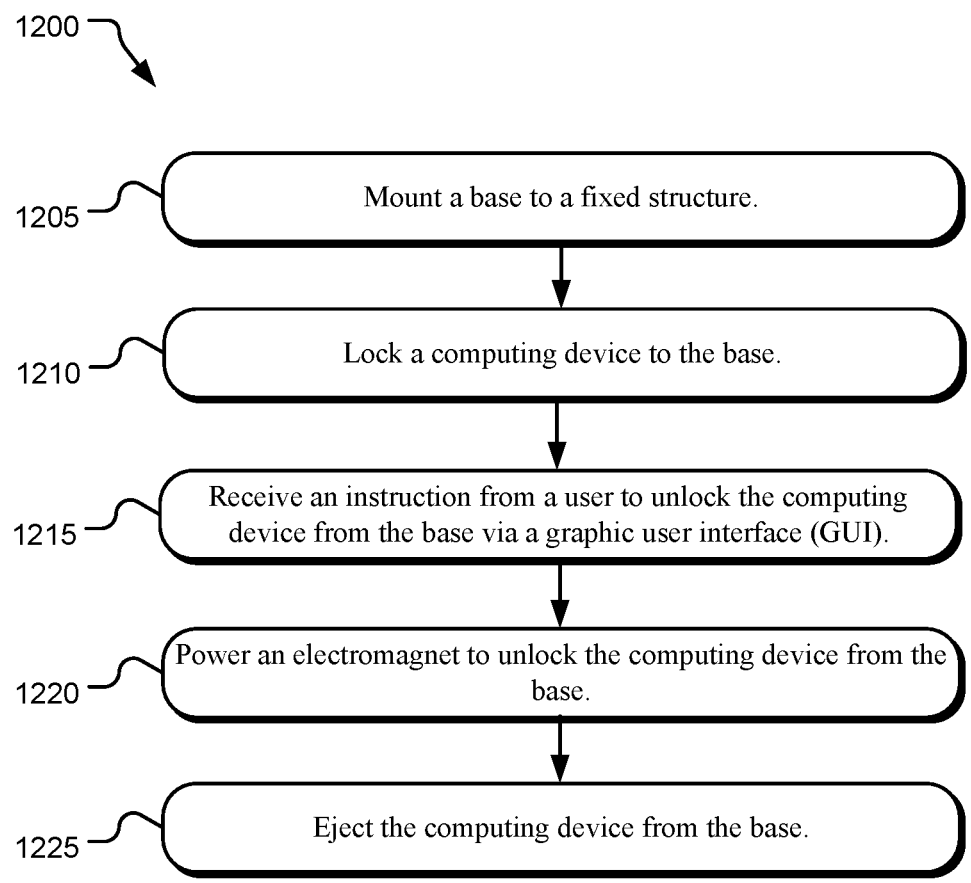
FIG. 12 illustrates example operations for using a secure electromagnetic docking system.

FIG. 12 illustrates example operations 1200 for using a secure electromagnetic docking system. A mounting operation 1205 mounts a base to a fixed structure. The mounting operation 1205 is intended to be permanent or semi-permanent so that the base is not quickly or easily removed from the fixed structure. This provides security against theft of a computing device locked to the based. A locking operation 1210 locks the computing device to the base. The computing device or the base includes one or more ferromagnetic structures that are biased to a locked position when the computing device is placed in a locked orientation with respect to the base. The ferromagnetic structures may be of a variety of sizes, shapes, and orientation, such as those described in detail above. The bias may be provide by spring-force, gravity, or a permanent magnet, for example. The computing device is by default locked to the base when it is physically placed in the locked orientation.

A receiving operation 1215 receives an instruction from a user to unlock the computing device from the base via a graphic user interface (GUI). The GUI may be running on software on the computing device, or another separate computing device. This allows for the possibility of remotely unlocking the computing device from the base. A powering operation 1220 powers an electromagnet to unlock the computing device from the base by moving the one or more ferromagnetic structures to an unlocked position. The powering operation 1220 is performed in response to the receiving operation 1215, in some cases using a computing unit within the computing device. An ejecting operation 1225 ejects the computing device from the base in response to the unlocking operation. In various implementations, the ejecting operation 1225 may utilize a rising ejector or a sliding ejector and may be performed automatically in response to the powering operation 1220.

The operations making up the embodiments of the invention described herein are referred to variously as operations, steps, objects, method steps, or modules. Furthermore, the operations may be performed in any order, adding or omitting operations as desired, unless explicitly claimed otherwise or a specific order is inherently necessitated by the claim language.

Implementations disclosed herein include an electromagnetic docking system comprising a base attachable to a fixed structure and a computing device. The base includes one or more catches, one or more ferromagnetic structures, the ferromagnetic structures biased to a locked position, and one or more spring loaded rising ejectors. The computing device includes one or more catch receptacles, each of which correspond to one of the catches, the catch receptacles to selectively engage the catches, and an electromagnet to be selectively powered to move the one or more ferromagnetic structures to an unlocked position. In the unlocked position, the one or more spring loaded rising ejectors are permitted to eject the computing device vertically away from the base.

In some implementations, the catches are spring-loaded barbs and the catch receptacles are to engage the spring-loaded barbs in the locked position.

In some implementations, the ferromagnetic structures are embedded within the spring-loaded barbs.

In some implementations, the electromagnet based at least on being powered is to retract the spring-loaded barbs and disengage the spring-loaded barbs from the catch receptacles in the unlocked position.

The computing device may further comprise a removable concealing foot that conceals the catch receptacles.

In some implementations, the rising ejectors automatically eject the computing device from the base in response to the ferromagnetic structures being moved to an unlocked position.

In some implementations, the electromagnet is selectively powered via a graphical user interface within software running on the computing device or another computing device.

Implementations disclosed herein include an electromagnetic docking system comprising a base, attachable to a fixed structure, and a computing device. The base includes one or more catches, one or more locking apertures, and one or more spring loaded sliding ejectors. The computing device includes one or more ferromagnetic structures, the ferromagnetic structures biased to a locked position wherein each of the ferromagnetic structure are seated within one of the locking apertures, one or more catch receptacles, each of which correspond to one of the catches, the catch receptacles to selectively engage the catches, and an electromagnet to be selectively powered to move the one or more ferromagnetic structures to an unlocked position. In the unlocked position, the one or more spring loaded sliding ejectors are permitted to eject the computing device horizontally along the base.

In some implementations, the catches are fixed hooks and the catch receptacles engage the fixed hooks in the locked position.

In some implementations, the ferromagnetic structures are spring-biased or gravity-biased to seat within their corresponding catch receptacles in the locked position.

In some implementations, the electromagnet based at least on being powered is to retract the ferromagnetic structures from their corresponding catch receptacles in the unlocked position.

The computing device may further comprise a removable concealing foot that conceals the catch receptacles and locking apertures.

In some implementations, the sliding ejectors automatically eject the computing device from the base in response to the ferromagnetic structures being moved to an unlocked position.

In some implementations, the ferromagnetic structures are rectangular or circular in cross section.

Implementations disclosed herein include a method of using an electromagnetic docking system comprising locking a computing device to a base, wherein one or more ferromagnetic structures are biased to a locked position in response to the computing device being placed in a locked orientation with respect to the base; receiving an instruction from a user to unlock the computing device from the base via a graphic user interface (GUI); powering an electromagnet to unlock the computing device from the base by moving the one or more ferromagnetic structures to an unlocked position; and ejecting the computing device from the base in response to the powering operation.

The method may further comprise mounting the base to a fixed structure prior to the locking operation.

In the method, the base may include one or more catches including the ferromagnetic structures; and one or more spring loaded rising ejectors. The computing device may include one or more catch receptacles, each of which correspond to one of the catches, the catch receptacles to selectively engage the catches. In the unlocked position, the one or more spring loaded rising ejectors are permitted to eject the computing device vertically away from the base.

In the method, the base may include one or more catches, one or more locking apertures, and one or more spring loaded sliding ejectors. The computing device may include one or more catch receptacles, each of which correspond to one of the catches, the catch receptacles to selectively engage the catches. In the unlocked position, the one or more spring loaded sliding ejectors are permitted to eject the computing device horizontally along the base.

In the method, the electromagnet may be selectively powered via the graphical user interface within software running on the computing device or another computing device.

The above specification, examples, and data provide a complete description of the structure and use of exemplary implementations of the presently disclosed technology. Since many implementations of the presently disclosed technology can be made without departing from the spirit and scope of the invention, the invention resides in the claims hereinafter appended. Furthermore, structural features of the different implementations may be combined in yet another implementation without departing from the recited claims.

What is claimed is:

1. An electromagnetic docking system comprising:
   a base, attachable to a fixed structure, the base including:
      one or more catches;
      one or more locking apertures; and
      one or more spring loaded sliding ejectors; and
   a computing device including:
      one or more ferromagnetic structures, the ferromagnetic structures biased to a locked position wherein each of the ferromagnetic structure are seated within one of the locking apertures;
      one or more catch receptacles, each of which correspond to one of the catches, the catch receptacles to selectively engage the catches; and
      an electromagnet to be selectively powered to move the one or more ferromagnetic structures to an unlocked position, wherein in the unlocked position, the one or more spring loaded sliding ejectors are permitted to eject the computing device horizontally along the base.

2. The electromagnetic docking system of claim 1, wherein the catches are fixed hooks and the catch receptacles engage the fixed hooks in the locked position.

3. The electromagnetic docking system of claim 1, wherein the ferromagnetic structures are spring-biased or gravity-biased to seat within their corresponding catch receptacles in the locked position.

4. The electromagnetic docking system of claim 1, wherein the electromagnet based at least on being powered is to retract the ferromagnetic structures from their corresponding catch receptacles in the unlocked position.

5. The electromagnetic docking system of claim 1, wherein the computing device further comprises:
   a removable concealing foot that conceals the catch receptacles and locking apertures.

6. The electromagnetic docking system of claim 1, wherein the sliding ejectors automatically eject the computing device from the base in response to the ferromagnetic structures being moved to an unlocked position.

7. The electromagnetic docking system of claim 1, wherein the electromagnet is selectively powered via a graphical user interface within software running on the computing device or another computing device.

8. The electromagnetic docking system of claim 1, wherein the ferromagnetic structures are rectangular or circular in cross section.

9. A method of using an electromagnetic docking system comprising:
   locking a computing device to a base, wherein one or more ferromagnetic structures are biased to a locked position in response to the computing device being placed in a locked orientation with respect to the base, wherein the base includes:
      one or more catches;
      one or more locking apertures; and
      one or more spring loaded sliding ejectors, wherein the computing device includes:
      one or more catch receptacles, each of which correspond to one of the catches, the catch receptacles to selectively engage the catches, wherein in the unlocked position, the one or more spring loaded sliding ejectors are permitted to eject the computing device horizontally along the base;
   receiving an instruction from a user to unlock the computing device from the base via a graphic user interface (GUI);
   powering an electromagnet to unlock the computing device from the base by moving the one or more ferromagnetic structures to an unlocked position; and
   ejecting the computing device from the base in response to the powering operation.

10. The method of claim 9, further comprising:
    mounting the base to a fixed structure prior to the locking operation.

11. The method of claim 9, wherein the electromagnet is selectively powered via the graphical user interface within software running on the computing device or another computing device.

* * * * *